United States Patent [19]

Galla et al.

[11] Patent Number: 4,582,861

[45] Date of Patent: Apr. 15, 1986

[54] DELAYED ACTION/ENHANCED CURING CATALYSIS IN POLYURETHANE SYSTEMS

[75] Inventors: Edward A. Galla, Macungie, Pa.; Robert L. Ricci, Utrecht, Netherlands; Gary D. Andrew, Walnutport, Pa.

[73] Assignee: Air Products and Chemicals, Inc., Allentown, Pa.

[21] Appl. No.: 670,705

[22] Filed: Nov. 13, 1984

[51] Int. Cl.[4] .................... C08G 18/14; C08G 18/18; 502 164

[52] U.S. Cl. .................................. 521/118; 252/182; 502/164; 528/49; 528/52; 521/902

[58] Field of Search .................... 528/49, 52; 521/118; 252/182

[56] References Cited

U.S. PATENT DOCUMENTS

| | | | |
|---|---|---|---|
| 3,010,963 | 11/1961 | Erner | 260/268 |
| 3,050,477 | 8/1962 | Smitter et al. | 260/2.5 |
| 3,087,912 | 4/1963 | Wagner et al. | 260/67 |
| 3,476,933 | 11/1969 | Mendelsohn | 260/2.5 |
| 3,824,199 | 7/1974 | Nadeau et al. | 260/2.5 |
| 3,892,687 | 7/1975 | Bechara et al. | 260/2.5 |
| 3,993,652 | 11/1976 | Bechara et al. | 260/268 |
| 4,040,992 | 8/1977 | Bechara et al. | 260/2.5 |
| 4,116,879 | 9/1978 | Bechara et al. | 252/426 |
| 4,136,240 | 1/1979 | Zimmerman et al. | 521/115 |
| 4,186,255 | 1/1980 | Klein et al. | 528/52 |
| 4,365,025 | 12/1982 | Murch et al. | 521/159 |

Primary Examiner—Herbert S. Cockeram
Attorney, Agent, or Firm—Michael Leach; James C. Simmons; E. Eugene Innis

[57] ABSTRACT

A method for preparing polyurethane product by the reaction of an organic polyisocyanate with a polyester or polyether polyol in the presence of a catalytically effective amount of a catalyst system consisting essentially of a tertiary amine and 1 to 35 wt %, based on the tertiary amine, of an N-hydroxyalkyl quaternary ammonium carbonylate salt. The use of such catalyst system advantageously improves the cure time of the urethane reaction, when compared to a system containing solely a tertiary amine, while maintaining the same initiation of the reaction. This advantage can be transferred to a delay in the initiation time while maintaining or shortening the cure time by adjustments in the total amount of the catalyst system used.

38 Claims, No Drawings

DELAYED ACTION/ENHANCED CURING CATALYSIS IN POLYURETHANE SYSTEMS

TECHNICAL FIELD

This invention relates to the tertiary amine catalysis of reactions involving organic polyisocyanates and polyols in the production of polyurethane products.

BACKGROUND OF THE INVENTION

In the polyurethane industry there is a need for a delayed action catalyst, i.e. a catalyst that will delay the onset of the isocyanate-polyol reaction ("initiation time") while not substantially affecting the time to the end of the reaction or final cure, or that will yield the same initiation time with a shorter cure time. The problem is manifested in the production of polyurethane shoe soles where it would be desirable if the polyurethane forming composition would not begin to react until it has essentially filled the mold form while also reaching a final cured state in substantially the same or shorter time period to maintain productivity.

Past attempts to solve this problem have centered around taking the standard amine catalyst, i.e. triethylenediamine, and blocking it with an acid to form the simple amine salt. In theory, this approach should work well but from experimentation it failed to delay the initiation time as desired without lengthening the cure time.

U.S. Pat. No. 4,040,992 discloses the polymerization and condensation reactions of organic isocyanates are catalytically promoted by the use of N-hydroxyalkyl quaternary ammonium carbonylate salts, for example, N-hydroxypropyl trimethyl ammonium salts of carboxylic acids such as those of formic and acetic acids and of fatty acids such as hexanoic and octanoic acids and the like.

U.S. Pat. No. 3,892,687 discloses certain acyclic quaternary hydroxyalkyl ammonium alkoxides and phenoxides useful as catalysts for making polyurethane and polyurethane-polyisocyanurate foams.

U.S. Pat. No. 3,993,652 discloses phenoxides of certain cyclic quaternary ammonium bases containing a hydroxyalkyl group attached to the hetero nitrogen as catalysts in reactions involving organic isocyanates.

U.S. Pat. No. 4,116,879 discloses the preparation of cellular polyurethane resins using as a catalyst certain quaternary hydroxyalkyl tertiary amine bases.

SUMMARY OF THE INVENTION

The present invention provides a method for the preparation of a polyurethane product by the reaction of an organic polyisocyanate with a polyester or polyether polyol in the presence of a tertiary amine catalyst, the improvement which comprises employing as the catalyst system, in addition to the tertiary amine, about 1 to 35 wt% based on the tertiary amine of a N-hydroxyalkyl quaternary ammonium salt of the general formula I

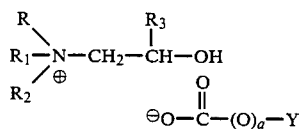

where $a$ is 0 or 1, $R$, $R_1$ and $R_2$ are independently alkyl or hydroxyalky groups of 1 to 20 carbon atoms, or cycloalkyl groups of 3 to 8 carbon atoms, aralkyl (e.g. benzyl), aryl (e.g. phenyl), alkenyl of 2 to 20 carbon atoms, or alkynyl of 2 to 6 carbon atoms, or $R$, $R_1$ and $R_2$ together with the nitrogen atom constitute an N-substituted heterocyclic 5 to 7 atom ring, examples of which include triethylenediamine, methyl triethylenediamine, quinuclidine, N-methyl morpholine, N-ethyl morpholine, N,N'dimethyl piperazine, and 1,8-diazo-bicyclo(5,4,0)-undecene-7;

$R_3$ is hydrogen, phenyl, an alkyl group of 1 to 15 carbon atoms, an alkenyl group of 2 to 15 carbon atoms, an alkynyl group of 2 to 6 carbon atoms, a hydroxyalkyl group of 1 to 9 carbon atoms, a ketoalkyl group having a total of 3 to 15 carbon atoms, or an alkoxy alkyl group having a total of 2 to 20 carbon atoms;

$Y$ is hydrogen, an alkyl group of 1 to 20 carbon atoms, an alkenyl group of 2 to 15 carbon atoms, a cycloalkyl group of 3 to 6 carbon atoms, phenyl, an alkylphenyl having 1 to 9 carbon atoms in the alkyl group or groups attached to the phenyl ring, benzyl, an alkylbenzyl having 1 to 9 carbon atoms in the alkyl group or groups attached to the benzene ring, or a $CH_{(3-b)}Z_{(b)}$ group wherein $b$ is 1 to 3 and Z is —OH, —CN, —Cl, an alkoxy group of 1 to 5 carbon atoms, a phenyl group or methoxyphenyl group, or Z is $(CH_2)_d COOR_4$ wherein $d$ is equal to 0 to 4 and $R_4$ is hydrogen or an alkyl group of up to 20 carbon atoms.

The tertiary amine compounds to which a minor amount of quaternary ammonium salt is added according to the invention are those tertiary amines typically used in the art for the preparation of polyurethane products.

As an advantage of the invention, the catalyst systems, when used in the reaction of organic polyisocyanate compounds with polyether or polyester polyols, provide a decrease in cure time while maintaining substantially the same initiation time when the catalyst system is used at about the same level as the tertiary amine by itself in the polyurethane reaction.

A further advantage is an increase in the initiation time while maintaining substantially the same cure, or demold, time at total catalyst levels which are lower than that for the tertiary amine alone.

DETAILED DESCRIPTION OF THE INVENTION

The method for preparing polyurethane product according to the invention involves the use of a particular catalyst system which consists essentially of a tertiary amine which catalyzes the isocyanate-polyol reaction and 1 to 35 wt%, preferably 3 to 25 wt%, based on tertiary amine, of a N-hydroxyalkyl quaternary ammonium carbonylate salt of the above general formula I.

Exemplary of the tertiary amines which can be used in the catalyst composition are those amines having the following general formula II

where
- $R_5$, $R_6$ and $R_7$ are independently alkyl or hydroxyalkyl groups of 1 to 20 carbon atoms, or cycloalkyl groups of 3 to 8 carbon atoms, aralkyl, aryl, alkenyl of 2 to 20 carbon atoms or alkynyl groups of 2 to 6 carbon atoms, or
- $R_5$, $R_6$ and $R_7$ together with the nitrogen atom form an N-substituted heterocyclic 5 to 7 atom ring structure, examples of which include triethylenediamine, methyl triethylenediamine, quinuclidine, N-methyl morpholine, N-ethyl morpholine, N,N'-dimethyl piperazine and 1,8-diazo-bicyclo(5,4,0)-undecene-7.

In addition to the heterocyclic amines just mentioned, other suitable tertiary amines include trimethylamine, dimethylethylamine, N-dimethyl-N-hydroxyethylamine, N-benzyl-N-dimethylamine, N-di(hydroxyethyl)-N-phenylamine, triethanolamine, N-cyclohexyl-N-dimethylamine, and bis(dimethylaminoethyl)ether. The preferred tertiary amines are triethylenediamine (TEDA), especially when the catalyst system is used in a polyurethane shoe sole formulation, and dimethylethanolamine (DMEA) combined with bis(dimethylaminoethyl)ether (BDMAEE) in a ratio of 5-8 parts DMEA per part of BDMAEE, especially a ratio of 6-7:1, when the catalyst system is used in a rigid appliance polyurethane foam system.

The preferred quaternary ammonium carbonylate salts for use in the catalyst system are those corresponding to the following general formula III

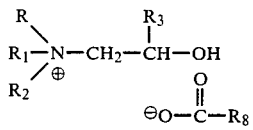

where
- R, $R_1$ and $R_2$ are as previously defined, $R_3$ is hydrogen or methyl and $R_8$ is hydrogen, an alkyl group of 1 to 18 carbon atoms, an alkenyl group of 2 to 15 carbon atoms, benzyl or —$CH_2CN$. Particularly, $R_1$ and $R_2$ are independently alkyl or hydroxyalkyl groups of 1 to 4 carbon atoms, or together with the nitrogen atom compose an N-substituted heterocyclic 5 to 7 atom, especially 6 atom, ring.

Of particular preference are the hydroxypropyl trimethyl ammonium salts, hydroxypropyl triethylenediamine and hydroxypropyl dimethylethanolamine quaternary salts of formic acid and fatty acids having up to 10 carbon atoms such as those of ethyl-hexanoic and various decanoic acids.

The preferred route for the preparation of the hydroxyalkyl quaternary ammonium carbonylate salts used in the invention is by reaction of the appropriate tertiary amine with an alkylene oxide in the presence of the chosen carboxylic acid. If the corresponding ammonium compound is commercially available as the hydroxide or alkoxide, formation of the desired carboxylate can be directly obtained by reaction of the quaternary ammonium base with the desired carboxylic acid. Preparation of the hydroxyalkyl quaternary ammonium carbonylates is more fully described in U.S. Pat. No. 4,040,992 which is incorporated by reference.

Among the tertiary amines that may be employed for reaction with the alkylene oxide and carboxylic acid to obtain the compounds used in accordance with the invention, there may be mentioned those amines containing 0 to 3 hydroxyalkyl groups and one or more alkyl, cycloalkyl or aryl groups attached to the nitrogen. Particular amines that have been so employed include: trimethylamine, N-dimethyl-N-hydroxyethylamine, N-benzyl-N-dimethylamine, N-di(hydroxyethyl)-N-phenylamine, triethanolamine, N-cyclohexyl-N-dimethylamine, N-methyl morpholine, triethylenediamine and quinuclidine.

Among the particular alkylene oxides that can be reacted with the foregoing and other tertiary amines there are included: ethylene oxide, propylene oxide, styrene oxide, glycidol and longer chain alkylene oxides.

Any one of a large variety of carboxylic acids may be used to furnish the anion of the desired quaternary ammonium salt. Among these, compounds of the above formula I are obtained with short to long chain fatty acids; substituted aliphatic acids; and aromatic carboxylic acids. Representative acids include formic, acetic, hexanoic, straight and branched chain heptanoic, octanoic, decanoic and hexadecanoic acids; neoacids such as 3,3-dimethyl butanoic acid; unsaturated aliphatic acids such as oleic, acrylic, methacrylic, undecenoic; aromatic acids such as benzoic, phenyl acetic and salicylic; and cyanoacetic and chloroacetic acids.

In the usual method of preparation of the desired hydroxyalkyl ammonium quaternary salts, equivalent amounts of a tertiary amine, a carboxylic acid and an alkylene oxide are mixed, preferably in the presence of a suitable solvent such as dipropylene glycol, ethylene glycol or 1,4-butanediol. The alkylene oxide may be used in amounts ranging from 0 to about 200% excess on a molar basis, especially a 100% molar excess when an amine compound having two tertiary amino groups; e.g., triethylenediamine, is used. The reaction is carried out at a temperature in the range of 25°–60° C. and at about atmospheric pressure, although higher pressures may be employed, if desired.

A catalytically effective amount of the catalyst system of the invention is used in the polyurethane formulation comprising polyisocyanate, polyether or polyester polyol, water or other suitable blowing agent, and cell stabilizers such as silicone surfactants. More specifically, suitable amounts of the catalyst system may range from about 0.1 to 3 parts per 100 parts polyol in the polyurethane formulations.

Examples of suitable polyisocyanates are hexamethylene, diisocyanate, phenylene diisocyanate, toluene diisocyanate, and 4,4'-diphenyl methane diisocyanate. Especially suitable are the 2,4- and 2,6-toluene diisocyanates individually or together as their commercially available mixtures. Other suitable mixtures of diisocyanates are those known commercially as "crude MDI", also known as PAPI, which contain about 60% of 4,4'-diphenylmethane diisocyanate along with other isomeric and analogous higher polyisocyanates. Also suitable are "prepolymers" of these polyisocyanates comprising a partially pre-reacted mixture of polyisocyanates and polyether or polyester polyol.

Illustrative of suitable polyols as a component of the polyurethane formulations catalyzed by the catalyst systems of the invention are the polyalkylene ether and polyester polyols. The polyalkylene ether polyols include the poly(alkylene oxide) polymers such as poly(ethylene oxide) and poly(propylene oxide) polymers and copolymers with terminal hydroxyl groups derived from polyhydric compounds including diols and triols for example, among others, ethylene glycol, propylene glycol, 1,3-butane diol, 1,4-butane diol, 1,6-hexane diol, neopentyl glycol, diethylene glycol, dipropylene glycol, pentaerythritol, glycerol, diglycerol, trimethylol propane, cyclohexane diol and like low molecular weight polyols.

Useful polyester polyols include those produced by reacting a dicarboxylic acid with an excess of a diol for example, adipic acid with ethylene glycol or butanediol, or reacting a lactone with an excess of a diol such as caprolactone and propylene glycol.

Other typical agents found in the polyurethane formulations include blowing agents such as water, methylene chloride, trichlorofluoromethane and the like, and cell stabilizers such as silicones.

A general polyurethane formulation suitable for shoe soles would comprise one of the following:

| POLYETHER POLYURETHANE FORMULATION | pbw |
| --- | --- |
| Polyether Polyol | 100 |
| Crosslinker (butanediol) | 5–15 |
| Water | 0–0.4 |
| Cell Stabilizer | 0–0.3 |
| Halocarbon Blowing Agent | 2–8 |
| Organometallic Catalyst (dibutyltin dilaurate) | 0–0.1 |
| Tertiary Amine (Triethylenediamine) | 0.3–0.6 |
| Quaternary Ammonium Salt | 0.03–0.12 |
| Isocyanate Prepolymer, free NCO % | 98–105 Index, 18–22% |
| POLYESTER POLYURETHANE FORMULATION | |
| Polyester Polyol | 100 |
| Crosslinker (ethylene glycol) | 5–15 |
| Water | 0–0.5 |
| Cell Stabilizer | 0–1 |
| Tertiary Amine (Triethylenediamine) | 0.3–0.6 |
| Quaternary Ammonium Salt | 0.03–0.25 |
| Isocyanate prepolymer, free NCO % | 96–104 Index, 18–22% |

A general rigid polyurethane formulation suitable for appliances would comprise the following:

| RIGID APPLIANCE POLYURETHANE FORMULATION | pbw |
| --- | --- |
| Polyol | 100 |
| Water | 0–2.0 |
| Cell Stabilizer | 0.7–2 |
| Halocarbon Blowing Agent | 20–55 |
| Tertiary Amine | 1–3 |
| Quaternary Ammonium Salt | 0.04–0.2 |
| Isocyanate | 100–110 Index |

EXAMPLE 1

The following preparation of trimethyl-N-2-hydroxypropyl ammonium 2-ethyl hexanoate was essentially as taught in U.S. Pat. No. 4,040,992. The other quaternary ammonium salts in the following examples were similarly prepared.

A suitable amount of glycol solvent is charged to a reaction vessel equipped with stirrer, dropping funnel, condenser and heating mantle. One mole of the appropriate carboxylic acid (144 g for 2-ethyl hexanoic acid) is added. The reaction vessel is surrounded with a cooling bath (about 15° C.) and one mole of the amine (59 g trimethyl amine) is added. The reaction temperature is allowed to reach 25° C. whereupon one mole of alkylene oxide (58 g propylene oxide) is added to the reaction mixture. Although the reaction is exothermic, it may be controlled by the slow addition of the alkylene oxide. After all the alkylene oxide has been added, the reaction temperature is maintained at about 40° C. for a period of time, preferably about 30 minutes.

EXAMPLE 2

A polyester polyol urethane shoe sole composition was prepared of the following ingredients in which various catalyst systems were used:

| POLYESTER POLYOL URETHANE SHOE SOLE COMPOSITION | |
| --- | --- |
| | pbw |
| WITCO E2456[a] | 100 |
| 1,4-BUTANEDIOL | 12 |
| WATER (added) | 0.3 |
| DC-193[b] | 0.2 |
| CATALYST | see Table 1 |
| ISONATE 240[c] | 98 Index |

[a] A polyester polyol having a hydroxyl number of 56 marketed by Witco Chemical Co.
[b] A silicone surfactant marketed by Dow Corning.
[c] 4,4'-diphenylmethane diisocyanate prepolymer having 18–19% free NCO marketed by Upjohn.

The catalyst system was mixed with the other components and the mixture stirred rapidly with a laboratory stirrer for 5 seconds, and the initiation time and "pinch" time were recorded. All times commenced when mixing began. The initiation time was visually observed as the moment the mixture began to rise. The cure was measured by recording the "pinch" time. This was determined by pinching a small piece of the risen polyurethane and vigorously pulling. Until the system had developed sufficient cure, the pinched piece tore away. When the cure was sufficiently developed, the pinched piece did not tear away and the system maintained its structural integrity. This time, directly indicative of cure, was recorded as the "pinch" time. The data is summarized in Table 1.

TABLE 1

| | POLYESTER POLYOL URETHANE FORMULATION | | | | |
| --- | --- | --- | --- | --- | --- |
| RUN | TERTIARY AMINE | (php) | QUATERNARY AMMONIUM SALT | (php) | INITIATION TIME (sec) | PINCH TIME (sec) |
| 1 | TEDA | (0.55) | — | — | 13 | 68 |
| 2 | TEDA-2EHA | (0.72) | — | — | 12 | 69 |
| 3 | TEDA-2FA | (0.57) | — | — | 15 | 110 |
| 4 | DMEA | (6.0) | — | — | 8 | >200 |
| 5 | AP | (7.0) | — | — | 10 | 77 |
| 6 | DMEA | (3.15) | TEDA/2EHA/PO | (0.35) | 10 | >200 |

TABLE 1-continued

POLYESTER POLYOL URETHANE FORMULATION

| RUN | TERTIARY AMINE (php) | | QUATERNARY AMMONIUM SALT (php) | | INITIATION TIME (sec) | PINCH TIME (sec) |
|---|---|---|---|---|---|---|
| 7  | BDMAEE | (4.05)  | TEDA/2EHA/PO | (0.45)  | 8  | 69 |
| 8  | TEDA   | (0.425) | TEDA/2EHA/PO | (0.05)  | 17 | 70 |
| 9  | TEDA   | (0.31)  | TEDA/2EHA/PO | (0.075) | 22 | 67 |
| 10 | TEDA   | (0.40)  | TEDA/CYAC/PO | (0.10)  | 17 | 70 |
| 11 | TEDA   | (0.44)  | TEDA/CYAC/PO | (0.225) | 16 | 68 |
| 12 | TEDA   | (0.425) | DMEA/2EHA/PO | (0.05)  | 16 | 65 |
| 13 | TEDA   | (0.31)  | DMEA/2EHA/PO | (0.075) | 16 | 68 |
| 14 | TEDA   | (0.31)  | DMEA/CYAC/PO | (0.075) | 17 | 70 |
| 15 | TEDA   | (0.275) | DMEA/CYAC/PO | (0.15)  | 21 | 65 |

AP — N,N,N',N'—2-Pentamethyl-1,2-propanediamine
BDMAEE — Bis (Dimethylaminoethyl) ether marketed as Dabco ® BL-19 catalyst by Air Products and Chemicals, Inc.
TEDA — Triethylenediamine marketed as Dabco ® crystal catalyst by Air Products and Chemicals, Inc.
DMEA — Dimethylethanolamine
2EHA — 2-Ethylhexanoic Acid
CYAC — Cyanoacetic Acid
FA — Formic Acid
PO — Propylene Oxide
php — parts per hundred parts polyol From Table 1 can be seen that Run 1 using triethylenediamine (TEDA) as the sole amine catalyst in this control example showed an initiation time of 13 seconds and a pinch time of 68 seconds. Runs 2 and 3 which used the 2-ethyl hexanoate and formic acid salts of TEDA, respectively, showed no advantage in initiation time or pinch time in Run 2 and a delay in both initiation and pinch times in Run 3. In Runs 8–15 some of the TEDA was replaced by minor amounts of the cyanoacetic acid and 2-ethyl hexanoic acid salts of triethylenediamine-N-2-hydroxypropyl quaternary amine and of dimethyl-N-hydroxyethyl-N-2-hydroxypropyl quaternary amine. In each instance the initiation time was significantly delayed while the pinch time remained substantially the same as the control.

EXAMPLE 3

In Runs 16–28 a polyether polyol urethane shoe sole composition containing various amine catalysts was prepared of the following ingredients:

| POLYETHER POLYOL URETHANE SHOE SOLE COMPOSITION | |
|---|---|
|  | pbw |
| Polyether Polyol[a] | 100 |
| 1,4-butanediol | 7 |
| Water (total) | 0.15 |
| $Cl_3CF$ | 7 |
| DC-193 | 0.1 |
| T-12[b] | 0.01–0.02 |
| Mondur PF[c] | 100 Index |

[a] A polyether polyol having an average hydroxyl number of 30.
[b] Dibutyltin dilaurate catalyst marketed by M&T Co.
[c] 4,4'-diphenylmethane diisocyanate prepolymer having 21–22% NCO marketed by Mobay Chemical Co.

The appropriate data is summarized in Table 2.

TABLE 2

POLYETHER POLYOL URETHANE FORMULATION

| RUN | TERTIARY AMINE (php) | | QUATERNARY AMMONIUM SALT (php) | | INITIATION TIME (sec) | PINCH TIME (sec) |
|---|---|---|---|---|---|---|
| 16 | TEDA | (0.50) | — | — | 19 | 65 |
| 17 | TEDA-OXALIC ACID | (1.17) | — | — | 18 | 72 |
| 18 | AP | (7.5) | — | — | 19 | 87 |
| 19 | DMEA | (4.0) | — | — | 15 | 200 |
| 20 | — | — | DMEA/2EHA/PO | (3.0) | 19 | 66 |
| 21 | TEDA/DMAEM | (0.5/0.5) | — | — | 16 | 70 |
| 22 | TEDA/DMAEM | (0.8/2.5) | — | — | 18 | 83 |
| 23 | TEDA/AP | (0.5/0.5) | — | — | 17 | 64 |
| 24 | TEDA | (0.36) | DMEA/2EHA/PO | (0.06) | 23 | 64 |
| 25 | TEDA | (0.36) | TMA/2EHA/PO | (0.06) | 23 | 69 |
| 26 | TEDA | (0.36) | TEDA/2EHA/PO | (0.06) | 22 | 70 |
| 27 | DMEA | (2.25) | TEDA/2EHA/PO | (0.25) | 20 | 200 |
| 28 | BDMAEE | (2.70) | TEDA/2EHA/PO | (0.30) | 16 | 62 |

DMAEM — 4-(2-dimethylaminoethyl) morpholine marketed as Dabco XDM ® catalyst by Air Products and Chemicals, Inc.
TMA — Trimethylamine Compared to the control Run 16 using TEDA as the sole amine catalyst Runs 17 and 21–23 using the oxalic acid salt of TEDA and blends of TEDA with other tertiary amines, respectively, showed a decrease in the initiation time and a delay in pinch time. This is the complete opposite of what is desired. Runs 24–26 according to the invention showed that a decreased amount of TEDA in combination with a minor amount of the indicated quaternary ammonium salt provided a significant delay in initiation time with no experimentally significant delay in pinch time in Runs 25 and 26.

EXAMPLE 4

This example shows the advantage of a significant decrease in pinch time while maintaining initiation time when using a catalyst system according to the invention in another typical polyester shoe sole formulation.

| POLYESTER URETHANE SHOE SOLE COMPOSITION | |
|---|---|
| | pbw |
| WITCO E-2456 | 100 |
| 1,4-BUTANEDIOL | 12 |
| WATER (added) | 0.3 |
| DC-193 | 0.2 |
| CATALYST | See Table 3 |
| MONDUR E-501[a] | 100 Index |

[a]A polyisocyanate having about 18-19% NCO marketed by Mobay Chemical Co.

TABLE 3

| RUN | AMINE (php) | QUATERNARY AMMONIUM SALT (php) | INITIATION TIME (SEC) | PINCH TIME (SEC) |
|---|---|---|---|---|
| 29 | TEDA (0.55) | — | 13 | 120 |
| 30 | TEDA (0.51) | TEDA/2EHA/PO (0.083) | 13 | 60 |

The data in Table 3 shows the effect of matching the initiation time of the control catalyst (Run 29) and substantially reducing the cure time (as measured by pinch time) by the use of a minor amount of quaternary ammonium salt with the tertiary amine, about 10-20 wt% based on tertiary amine, specifically about 16 wt% in Run 30.

EXAMPLE 5

This example demonstrates the ability to achieve both a substantially delayed initiation time and substantially faster cure time. The general formulation employed was the following:

| | pbw |
|---|---|
| Polyester Polyol (1,4-butanediol adipate) | 100 |
| 1,4-butanediol | 8-10 |
| Water | 0.2-0.3 |
| Silicone Surfactant | 0.5 |
| Catalyst | See Table 4 |
| Isocyanate Prepolymer, 19% NCO | 98 Index |

TABLE 4

| RUN | AMINE (php) | QUATERNARY AMMONIUM SALT (php) | INITIATION TIME (SEC) | PINCH TIME (SEC) |
|---|---|---|---|---|
| 31 | TEDA | — | 9 | 162 |
| | (0.5) | | | |
| 32 | TEDA (0.278) | TEDA/2EHA/PO (0.045) | 13 | 120 |
| 33 | TEDA (0.27) | TEDA/2EHA/PO (0.06) | 15 | 92 |
| 34 | TEDA (0.45) | TEDA/2EHA/PO (0.1) | 10 | 51 |

From Table 4 it can be seen that the control system of Run 31 was substantially improved by the addition of small amounts of a quaternary ammonium salt in Runs 32 and 33 which employed a catalyst blend of TEDA and between 16-22 wt% of the quaternary ammonium salt, based on TEDA. In both cases the initiation time was extended, by 44% and 67% respectively, while the pinch time was shortened by 26% and 43%, respectively. In Run 34 the pinch time was decreased by 68% while achieving a delay in initiation of 10%.

In subsequent experiments involving other polyester and polyether shoe sole systems, it was determined that an amount of propylene oxide in excess of equimolar with the tertiary amine; i.e., about 100% excess, in the manufacture of the TEDA quarternary salt yielded the best reactivity results.

EXAMPLE 6

This example shows the application of the invention to a typical rigid appliance polyurethane foam formulation.

| RIGID APPLIANCE URETHANE COMPOSITION | |
|---|---|
| | pbw |
| PLURICOL 1009[a] | 100 |
| DC-193 | 1.5 |
| WATER | 0.5 |
| Cl$_3$CF | 40.0 |
| CATALYST | See Table 5 |
| MONDUR M-437[b] | 102 index |

[a]A polyol comprising a sucrose and amine blend having a hydroxyl number of 415 marketed by BASF
[b]A polyisocyanate prepolymer having 34% NCO marketed by Mobay Chemical Co.

The catalyst system was mixed with the other components and stirred for about 5 seconds, then discharged into a container of ample size. All times commenced with the beginning of the mixing. The initiation time was visually observed as the moment the mixture began to rise. The top of the rising foam was constantly tapped with the edge of a tongue depressor. The string gel time was recorded as the first time that "strings" formed between the foam and the tongue depressor. The tack free time was that time at which no foam stuck to a second tongue depressor.

TABLE 4

| RIGID APPLIANCE URETHANE FORMULATIONS | | | | | | |
|---|---|---|---|---|---|---|
| | TERTIARY AMINE (php) | | QUATERNARY | TIME (seconds)$^2$ | | |
| RUN | DMEA | BDMAEE[1] | AMMONIUM SALT (php) | INITIATION | GEL | TACK FREE |
| 35 | 1.615 | .248 | — | — | 5 | 29 | 58 |
| 36 | 1.535 | .236 | TMA/EHA/PO (.074) | 5 | 27 | 46 |
| 37 | 1.454 | .223 | TMA/EHA/PO (.148) | 5 | 25 | 49 |
| 38 | 1.535 | .236 | DMEA/FA/PO (.098) | 5 | 27 | 62 |
| 39 | 1.454 | .223 | DMEA/FA/PO (.197) | 5 | 27 | 55 |
| 40 | 1.535 | .236 | TEDA/EHA/PO (.049) | 6 | 29 | 51 |

TABLE 4-continued

| | RIGID APPLIANCE URETHANE FORMULATIONS | | | | | |
|---|---|---|---|---|---|---|
| | TERTIARY AMINE (php) | | | TIME (seconds)[2] | | |
| RUN | DMEA | BDMAEE[1] | QUATERNARY AMMONIUM SALT (php) | INITIATION | GEL | TACK FREE |
| 41 | 1.454 | .223 | TEDA/EHA/PO (.098) | 6 | 27 | 52 |
| 42 | 1.535 | .236 | TMA/FA/PO (.049) | 5 | 29 | 63 |
| 43 | 1.454 | .223 | TMA/FA/PO (.098) | 5 | 30 | 54 |

[1] Bis(dimethylaminoethyl)ether marketed as Dabco BL-19 by Air Products and Chemicals, Inc.
[2] Average of runs Runs 36–39 of Table 4 show the decrease in gel time of a rigid appliance urethane composition using as the catalyst trimethyl-N-2-hydroxypropyl ammonium 2-ethylhexanoate and dimethyl-N-hydroxyethyl-N-2-hydroxypropyl ammonium formate. Runs 40, 41 and 43 show shorter tack free time while Runs 40–42 show the same or slightly longer initiation time.

STATEMENT OF INDUSTRIAL APPLICATION

The method of the invention provides delayed action/enhanced cure catalyst systems for polyurethane compositions that can delay the initiation time of the urethane reaction while maintaining the cure time, or maintain the initiation time while decreasing the cure time, or both, by varying the amount of the catalyst system used.

We claim:

1. In a method for the preparation of a polyurethane product by reacting a polyisocyanate with a polyester or a polyether polyol in the presence of a tertiary amine catalyst, the improvement which comprises employing a catalytically effective amount of a mixture consisting essentially of a tertiary amine and 1 to 35 weight percent, based on the tertiary amine, of an organic acid salt of a quaternary ammonium compound of the formula:

$$\begin{array}{c} R \\ R_1-\overset{\oplus}{N}-CH_2-\overset{R_3}{\underset{|}{C}H}-OH \\ R_2 \\ \ominus O-\overset{O}{\underset{\|}{C}}-(O)_a-Y \end{array}$$

wherein
a is 0 or 1,
R, $R_1$ and $R_2$ are independently alkyl or hydroxyalky groups of 1 to 20 carbon atoms, or cycloalkyl groups of 3 to 8 carbon atoms, aralkyl (e.g. benzyl), aryl (e.g. phenyl), alkenyl of 2 to 20 carbon atoms, or alkynyl of 2 to 6 carbon atoms, or
R, $R_1$ and $R_2$ together with the nitrogen atom form an N-substituted heterocyclic 5–7 atom ring structure;
$R_3$ is hydrogen, phenyl, an alkyl group of 1 to 15 carbon atoms, an alkenyl group of 2 to 15 carbon atoms, alkynyl group of 2 to 6 carbon atoms, a hydroxyalkyl group of 1 to 9 carbon atoms, a ketoalkyl group having a total of 3 to 15 carbon atoms, or an alkoxy alkyl group having a total of 2 to 20 carbon atoms;
Y is hydrogen, an alkyl group of 1 to 20 carbon atoms, an alkenyl group of 2 to 15 carbon atoms, a cycloalkyl group of 3 to 6 carbon atoms, phenyl, an alkylphenyl having 1 to 9 carbon atoms in the alkyl group or groups attached to the phenyl ring, benzyl, an alkylbenzyl having 1 to 9 carbon atoms in the alkyl group or groups attached to the benzene ring, or a $CH_{(3-b)}Z_{(b)}$ group wherein
b is 1 to 3 and Z is —OH, —CN, —Cl, an alkoxy group of 1 to 5 carbon atoms, a phenyl group or methoxyphenyl group, or
Z is $(CH_2)_d COOR_4$ wherein d is equal to 0 to 4 and $R_4$ is hydrogen or an alkyl group of up to 20 carbon atoms.

2. The method of claim 1 in which the quaternary ammonium salt is 3–25 wt% of the tertiary amine.

3. The method of claim 1 in which the tertiary amine has the following general formula $$\begin{array}{c} R_5 \\ R_6-N \\ R_7 \end{array}$$

where
$R_5$, $R_6$ and $R_7$ are independently alkyl or hydroxyalkyl groups of 1 to 20 carbon atoms, or cycloalkyl groups of 3 to 8 carbon atoms, aralkyl, aryl, alkenyl of 2 to 20 carbon atoms or alkynyl 2 to 6 carbon atoms, or
$R_5$, $R_6$ and $R_7$ together with the nitrogen atom form an N-substituted heterocyclic 5–7 atom ring structure.

4. The method of claim 1 in which the tertiary amine is triethylenediamine.

5. The method of claim 1 in which the tertiary amine comprises 5 to 8 parts dimethylethanolamine per part of bis(dimethylaminoethyl)ether.

6. The method of claim 1 in which the quaternary ammonium salt has the general formula:

$$\begin{array}{c} R \\ R_1-\overset{\oplus}{N}-CH_2-\overset{R_3}{\underset{|}{C}H}-OH \\ R_2 \\ \ominus O-\overset{O}{\underset{\|}{C}}-R_8 \end{array}$$

where
R, $R_1$ and $R_2$ are independently alkyl or hydroxyalkyl groups of 1 to 4 carbon atoms, or together with the nitrogen atom form an N-substituted heterocyclic 5–7 atom ring structure,
$R_3$ is hydrogen or methyl and $R_8$ is hydrogen, an alkyl group of 1 to 18 carbon atoms, an alkenyl group of 2 to 15 carbon atoms, benzyl or —$CH_2CN$.

7. The method of claim 1 in which the quaternary ammonium salt is the 2-ethyl hexanoic acid salt of triethylenediamine-N-2-hydroxypropyl quaternary amine.

8. The method of claim 1 in which the quaternary ammonium salt is the 2-ethyl hexanoic acid salt of dimethyl-N-hydroxyethyl-N-2-hydroxypropyl quaternary amine.

9. The method of claim 1 in which the quaternary ammonium salt is the 2-ethyl hexanoic acid salt of trimethyl-N-2-hydroxypropyl quaternary amine.

10. The method of claim 1 in which the quaternary amine salt is the cyanoacetic acid salt of triethylenediamine-N-2-hydroxypropyl quaternary amine or dimethyl-N-hydroxyethyl-N-2-hydroxypropyl quaternary amine.

11. The method of claim 1 in which the quaternary ammonium salt is the formic acid salt of triethylenediamine-N-2-hydroxypropyl quaternary amine; dimethyl-N-hydroxyethyl-N-2-hydroxypropyl quaternary amine or trimethyl-N-2-hydroxypropyl quaternary amine.

12. In a method for the preparation of a polyurethane product by the reaction of a polyisocyanate with a polyester or polyether polyol in the presence of a tertiary amine catalyst, the improvement which comprises employing a catalytically effective amount of a composition consisting essentially of a tertiary amine of the following general formula:

where
R$_5$, R$_6$ and R$_7$ are independently alkyl or hydroxyalkyl groups of 1 to 20 carbon atoms, or cycloalkyl groups of 3 to 8 carbon atoms, aralkyl, aryl, alkenyl of 2 to 20 carbon atoms or alkynyl 2 to 6 carbon atoms, or R$_5$, R$_6$ and R$_7$ together with the nitrogen atom form an N-substituted heterocyclic 5 to 7 atom ring, and 1 to 35 wt%, based on tertiary amine, of an organic acid salt of a quaternary ammonium compound of the general formula:

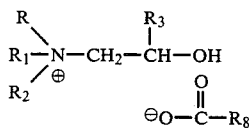

where
R, R$_1$ and R$_2$ are independently alkyl or hydroxyalkyl groups of 1 to 4 carbon atoms, or together with the nitrogen atom form an N-substituted heterocyclic 5-7 atom ring structure, R$_3$ is hydrogen or methyl and R$_8$ is hydrogen, an alkyl group of 1 to 18 carbon atoms, an alkenyl group of 2 to 15 carbon atoms, benzyl or —CH$_2$CN.

13. The method of claim 12 in which the quaternary ammonium salt is 3-25 wt% of the tertiary amine.

14. The method of claim 12 in which the catalyst composition is present in an amount from 0.1 to 3 parts per 100 parts polyol.

15. The method of claim 14 in which the polyol is a polyester polyol.

16. The method of claim 14 in which the polyol is a polyether polyol.

17. A catalyst composition for the catalysis of the isocyanate/polyol reaction consisting essentially of a tertiary amine and 1 to 35 weight percent, based on the tertiary amine, of an organic acid salt of a quaternary ammonium compound of the formula:

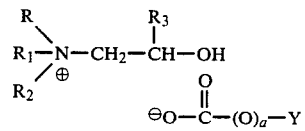

where
a is 0 or 1,
R, R$_1$ and R$_2$ are independently alkyl or hydroxyalky groups of 1 to 20 carbon atoms, or cycloalkyl groups of 3 to 8 carbon atoms, aralkyl (e.g. benzyl), aryl (e.g. phenyl), alkenyl of 2 to 20 carbon atoms, or alkynyl of 2 to 6 carbon atoms, or
R, R$_1$ and R$_2$ together with the nitrogen atom form an N-substituted heterocyclic 5-7 atom ring structure;
R$_3$ is hydrogen, phenyl, an alkyl group of 1 to 15 carbon atoms, an alkenyl group of 2 to 15 carbon atoms, an alkynyl group of 2 to 6 carbon atoms, a hydroxyalkyl group of 1 to 9 carbon atoms, a ketoalkyl group having a total of 3 to 15 carbon atoms, or an alkoxy alkyl group having a total of 2 to 20 carbon atoms;
Y is hydrogen, an alkyl group of 1 to 20 carbon atoms, an alkenyl group of 2 to 15 carbon atoms, a cycloalkyl group of 3 to 6 carbon atoms, phenyl, an alkylphenyl having 1 to 9 carbon atoms in the alkyl group or groups attached to the phenyl ring, benzyl, an alkylbenzyl having 1 to 9 carbon atoms in the alkyl group or groups attached to the benzene ring, or a CH$_{(3-b)}$Z$_{(b)}$ group wherein
b is 1 to 3 and Z is —OH, —CN, —Cl, an alkoxy group of 1 to 5 carbon atoms, a phenyl group or methoxyphenyl group, or
Z is (CH$_2$)$_d$COOR$_4$ wherein d is equal to 0 to 4 and R$_4$ is hydrogen or an alkyl group of up to 20 carbon atoms.

18. The catalyst composition of claim 17 in which the tertiary amine has the following general formula:

where
R$_5$, R$_6$ and R$_7$ are independently alkyl or hydroxyalkyl groups of 1 to 20 carbon atoms, or cycloalkyl groups of 3 to 8 carbon atoms, aralkyl, aryl, alkenyl of 2 to 20 carbon atoms or alkynyl 2 to 6 carbon atoms, or
R$_5$, R$_6$ and R$_7$ together with the nitrogen atom form an N-substituted heterocyclic 5-7 atom ring structure.

19. The catalyst composition of claim 18 in which a quaternary ammonium salt has the general formula:

$$\begin{array}{c} R \\ R_1 - N - CH_2 - CH - OH \\ R_2 \quad \oplus \quad \quad O \\ \quad \quad \quad \ominus O - \overset{\|}{C} - R_8 \end{array} \quad \begin{array}{c} R_3 \\ | \end{array}$$

where

R, $R_1$ and $R_2$ are independently alkyl or hydroxyalkyl groups of 1 to 4 carbon atoms, or together with the nitrogen atom form an N-substituted heterocyclic 5-7 atom ring structure, $R_3$ is hydrogen or methyl and $R_8$ is hydrogen, an alkyl group of 1 to 18 carbon atoms, an alkenyl group of 2 to 15 carbon atoms, benzyl or $-CH_2CN$.

20. The catalyst composition of claim 19 in which the tertiary amine is triethylenediamine.

21. The catalyst composition of claim 19 in which the tertiary amine comprises 5 to 8 parts dimethylethanolamine per part of bis(dimethylaminoethyl)ether.

22. The catalyst composition of claim 19 in which the quaternary ammonium salt is the 2-ethyl hexanoic acid salt of triethylenediamine-N-2-hydroxypropyl quaternary amine.

23. The catalyst composition of claim 19 in which the quaternary ammonium salt is the 2-ethyl hexanoic acid salt of dimethyl-N-hydroxyethyl-N-2-hydroxypropyl quaternary amine.

24. The catalyst composition of claim 19 in which the quaternary ammonium salt is the 2-ethyl hexanoic acid salt of trimethyl-N-2-hydroxypropyl quaternary amine.

25. The catalyst composition of claim 20 in which the quaternary ammonium salt is the 2-ethyl hexanoic acid salt of triethylenediamine-N-2-hydroxypropyl quaternary amine.

26. The catalyst composition of claim 21 in which the quaternary ammonium salt is the 2-ethyl hexanoic acid salt of triethylenediamine-N-2-hydroxypropyl quaternary amine.

27. The catalyst composition of claim 20 in which the quaternary ammonium salt is the 2-ethyl hexanoic acid salt of dimethyl-N-hydroxyethyl-N-2-hydroxypropyl quaternary amine.

28. The catalyst composition of claim 20 in which the quaternary ammonium salt is the 2-ethyl hexanoic acid salt of trimethyl-N-2-hydroxypropyl quaternary amine.

29. A polyurethane composition comprising the following components in parts by weight:
Polyether Polyol—100,
Crosslinker—5-15,
Water—0-0.4,
Cell Stabilizer—0-0.3,
Halocarbon Blowing Agent—2-8,
Organometallic Catalyst—0-0.1,
Isocyanate Prepolymer, free NCO%—98-105 Index, 18-22%,
and the catalyst composition of claim 19 in which the tertiary amine is 0.3-0.6 parts by weight and the quaternary ammonium salt is 0.03-0.12 parts by weight.

30. A polyurethane composition comprising the following components in parts by weight:
Polyether Polyol—100,
Crosslinker—5-15,
Water—0-0.4,
Cell Stabilizer—0-0.3,
Halocarbon Blowing Agent—2-8,
Organometallic Catalyst—0-0.1,
Isocyanate Prepolymer, free NCO%—98-105 Index, 18-22%,
and the catalyst composition of claim 20 in which the tertiary amine is 0.3-0.6 parts by weight and the quaternary ammonium salt is 0.03-0.12 parts by weight.

31. The polyurethane composition comprising the following components in parts by weight
Polyether Polyol—100,
Crosslinker—5-15,
Water—0-0.4,
Cell Stabilizer—0-0.3,
Halocarbon Blowing Agent—2-8,
Organometallic Catalyst—0-0.1,
Isocyanate Prepolymer, free NCO%—98-105 Index, 18-22%,
and the catalyst composition of claim 25 in which the tertiary amine is 0.3-0.6 parts by weight and the quaternary ammonium salt is 0.03-0.12 parts by weight.

32. A polyurethane composition comprising the following components in parts by weight:
Polyester Polyol—100,
Crosslinker (ethylene glycol)—5-15,
Water—0-0.5,
Cell Stabilizer—0-1,
Isocyanate prepolymer, free NCO%—96-104 Index, 18-22%,
and the catalyst composition of claim 17 in which the tertiary amine is present at 0.3-0.6 parts by weight and the quaternary ammonium salt is present at 0.03-0.25 parts by weight.

33. A polyurethane composition comprising the following components in parts by weight:
Polyester Polyol—100,
Crosslinker (ethylene glycol)—5-15,
Water—0-0.5,
Cell Stabilizer—0-1,
Isocyanate prepolymer, free NCO%—96-104 Index, 18-22%,
and the catalyst composition of claim 20 in which the tertiary amine is present at 0.3-0.6 parts by weight and the quaternary ammonium salt is present at 0.03-0.25 parts by weight.

34. A polyurethane composition comprising the following components in parts by weight:
Polyester Polyol—100,
Crosslinker (ethylene glycol)—5-15,
Water—0-0.5,
Cell Stabilizer—0-1,
Isocyanate prepolymer, free NCO%—96-104 Index, 18-22%,
and the catalyst composition of claim 25 in which the tertiary amine is present at 0.3-0.6 parts by weight and the quaternary ammonium salt is present at 0.03-0.25 parts by weight.

35. The polyurethane composition comprising the following components in parts by weight:
Polyester Polyol—100,
Crosslinker (ethylene glycol)—5-15,
Water—0-0.5,
Cell Stabilizer—0-1,
Isocyanate prepolymer, free NCO%—96-104 Index, 18-22%,
and the catalyst composition of claim 27 in which the tertiary amine is present at 0.3-0.6 parts by weight and the quaternary ammonium salt is present at 0.03-0.25 parts by weight.

36. A polyurethane composition comprising the following components in parts by weight:

Polyol—100,
Water—0–2,
Cell Stabilizer—0.7–2,
Halocarbon Blowing Agent—20–55,
Isocyanate—100–110 Index, and the catalyst composition of claim 17 in which the tertiary amine is present at 1–3 parts by weight and the quaternary ammonium salt is present at 0.04–0.2 parts by weight.

37. The polyurethane composition comprising the following components in parts by weight:
Polyol—100,
Water—0–2,
Cell Stabilizer—0.7–2,
Halocarbon Blowing Agent—20–55,
Isocyanate—100–110 Index, and the catalyst composition of claim 21 in which the tertiary amine is present at 1–3 parts by weight and the quaternary ammonium salt is present at 0.04–0.2 parts by weight.

38. The polyurethane composition comprising the following components in parts by weight:
Polyol—100,
Water—0–2,
Cell Stabilizer—0.7–2,
Halocarbon Blowing Agent—20–55,
Isocyanate—100–110 Index, and the catalyst composition of claim 26 in which the tertiary amine is present at 1–3 parts by weight and the quaternary ammonium salt is present at 0.04–0.2 parts by weight.

* * * * *